United States Patent [19]

Hori et al.

[11] Patent Number: 4,927,793
[45] Date of Patent: May 22, 1990

[54] PROTON CONDUCTIVE MATERIAL AND METHOD OF MANUFACTURING THEREOF

[75] Inventors: Saburo Hori, Tokyo; Nobuhiro Watanabe, Matsudo, both of Japan

[73] Assignee: Kureha Chemical Industry Co., Ltd., Tokyo, Japan

[21] Appl. No.: 235,735

[22] Filed: Aug. 22, 1988

[30] Foreign Application Priority Data

Aug. 20, 1987 [JP] Japan .............................. 62-207138

[51] Int. Cl.$^5$ .............................................. C04B 35/46
[52] U.S. Cl. ..................................... 501/134; 252/520; 429/33; 429/193; 423/396; 423/598; 423/600
[58] Field of Search ....................... 252/520; 501/134; 429/33, 193; 423/596, 598, 600

[56] References Cited

U.S. PATENT DOCUMENTS 3,687,735 8/1972 Inoue .............................. 501/134 X
4,655,967 4/1987 Morimoto et al. ............. 501/134 X
4,746,638 5/1988 Hori et al. .

OTHER PUBLICATIONS

JCPDS Publication: Powder Diffraction File, Sets 19 to 20'', 1979, File No. 21-1166 and File No. 19-1249.
"Collective Technology for Ceramics Material" by the Edition Committee of Collective Technology for Ceramics Material, pp. 329–330, published from Industrial Technology Center on 4/79 (discussed at page 2 of the specification).
"Proton Conductive Ceramics and Their Application to Fuel Cells" by Hironobu Iwahara and Hiroyuki Uchida, in 1985's Research Report for Special Research under the Scientific Research Funds for Ministry of Education, Feb. 1986 (discussed at pp. 2-3 of specification).

PED Morgan, et al, J. Am. Ceram. Soc., 68(6)C-15-6-158 (1985) (discussed at page 5 of the specification).

Primary Examiner—Mark L. Bell
Assistant Examiner—Karl Group
Attorney, Agent, or Firm—Lowe, Price, LeBlanc, Becker & Shur

[57] ABSTRACT

Proton conductive material comprising a compound of a monoclinic crystal structure which is in a reversibly reduced state from a compound of a similar monoclinic crystal structure represented by the general formula:

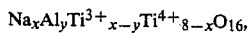

$$Na_xAl_yTi^{3+}{}_{x-y}Ti^{4+}{}_{8-x}O_{16},$$

in which $1.5 \leq x \leq 2$, $1.5 \leq y \leq 2$, $x \geq y$.

The compund of a monoclinic crystal structure, represented by the general formula: $Na_xAl_yTi^{3+}{}_{x-y}Ti^{4+}{}_{8-x}O_{16}$ is changed reversibly to a compound of a monoclinic crystal structure in a reduced state by a reducing treatment at a temperature within a range from 600°°C. to 1000° C. Such a compound of a monoclinic crystal structure which is in a reduced state is changed reversibly back to the compound of a monoclinic crystal structure, represented by the general formula: $Na_xAl_yTi^{3+}{}_{x-y}Ti^{4+}{}_{8-x}O_{16}$ by applying heat treatment in air at a temperature within a range from 1200° C. to 1300° C. A method of producing such proton conductive material comprises the steps of mixing starting alumina material, starting titania material and a sodium salt, sintering at a temperature within a range from 1000° C. to 1300° C. and then applying a reducing treatment in a hydrogen atmosphere at a temperature within a range from 600° C. to 1000° C.

6 Claims, 7 Drawing Sheets

PROTON CONDUCTIVE MATERIAL AND METHOD OF MANUFACTURING THEREOF

BACKGROUND OF THE INVENTION

1. Field of the Invention

The present invention concerns material as solid electrolytes that can be used for fuel cells using hydrogen ions, that is, protons as charge carriers for the production of hydrogen by steam electrolysis, or sensor material for combustible gases such as hydrogen, as well as methods of manufacturing such material.

2. Description of the Prior Art

Proton conductive solid material is expected as an electrolyte used for fuel cells or for the production of hydrogen by steam hydrolysis. Important properties required for the proton conductive material are that it has high conductivity but does not have any significant contribution of charge carriers (oxygen ions, electrons, etc.) other than protons. Further, since the material is used as a thin film for reducing the electrical resistance, it is also important that the material has no gas permeability and sufficient mechanical strength. In addition, it is also desired that the material is relatively inexpensive from an economical point of view.

Among the proton conductive materials reported so far, hydrates of phosphorus tungstic acid (PWA: $H_3PW_{12}O_{40} \cdot 29H_2O$), etc. show relatively high electroconductivity of $4 \times 10^{-2} \Omega^{-1} cm^{-1}$ at room temperature. However, such hydrates are not practical for use in fuel cells, etc. though they can be used for sensors, since they suffer from the effects of steam partial pressure and temperature of the atmosphere surrounding them (refer to "Collective Technology for Ceramics Material" by the Edition Committee of Collective Technology for Ceramics Material, p 329-330, published from Industrial Technology Center, on April 10, 1979).

Known proton conductive materials other than hydrates showing satisfactory electroconductivity are those sintered products prepared by partially substituting Ce in $BaCeO_3$ with Nd, La, etc. or those sintered products prepared by partially substituting Ce in $SrCeO_3$ with In, Yb, etc. Most preferred proton conductivity has been reported for $BaCe_{0.9}Nd_{0.1}O_{3-a}$ in which 10% of Ce is substituted with Nd and oxygen defects are formed to some extent. However, the conductivity in a hydrogen gas stream is only about $1.4 \times 10^{-2} \Omega^{-1} cm^{-1}$ at 800° C. and about $7 \times 10^{-3} \Omega^{-1} cm^{-1}$ at 600° C. ("Proton Conductive Ceramics and Their Application to Fuel cells" by Hironobu Iwahara, Hiroyuki Uchida, in 1985's Research Report for Special Research under the Scientific Research Funds of Ministry of Education, February 1986).

OBJECT OF THE INVENTION

As has been described above, proton conductive materials known so far involve various problems as in the following. They can not be used stably as solid electrolytes for fuel cells, do not show electroconductivity unless put under rather high temperature conditions, their electroconductivity is not sufficient in view of practical use, and they are relatively expensive materials to having various problems.

The present invention has been accomplished for overcoming such problems and providing proton conductive material that operates stably, shows remarkably high electroconductivity even at low temperatures as compared with previous materials and comprises relatively inexpensive components.

SUMMARY OF THE INVENTION

The first invention disclosed in the present application for attaining the foregoing object concerns proton conductive material comprising a compound of a monoclinic crystal structure which is in a reversibly reduced state from a compound of a similar monoclinic crystal structure, represented by $Na_xAl_yTi^{3+}{}_{x-y}Ti^{4+}{}_{8-x}O_{16}$ (in which $1.5 \leq x \leq 2$, $1.5 \leq y \leq 2$, $x \geq y$).

The second invention in the present application concerns a method of producing proton conductive material wherein starting alumina material, starting titania material and a sodium salt are mixed and sintered at a temperature from 1000° C. to 1300° C. and then applied with a reducing treatment in the hydrogen atmosphere at a temperature from 600° C. to 1000° C.

BRIEF DESCRIPTION OF THE DRAWINGS

These and other objects, features as well as advantages of the present invention will become apparent upon reading the following descriptions in conjunction with the accompanying drawings, wherein.

DETAILED DESCRIPTION OF THE INVENTION

Compound Before Reduction

Figure 1:
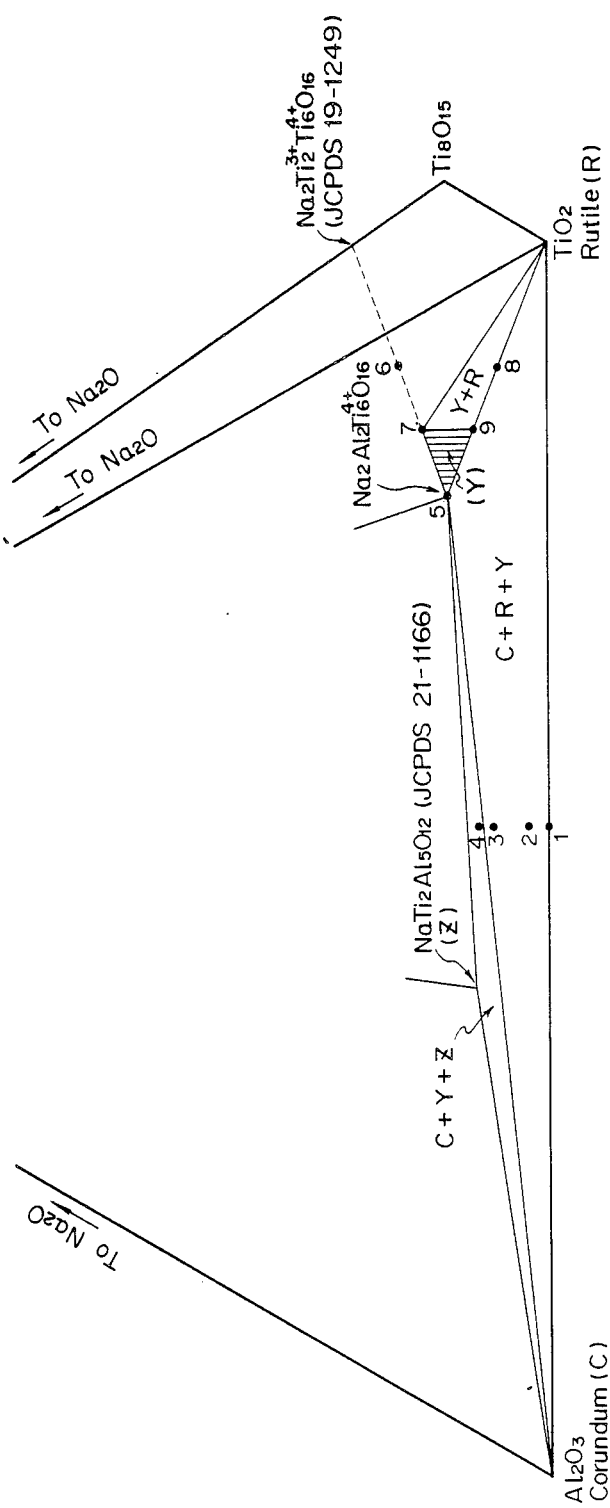
FIG. 1 is a graph illustrating a phase relation in Na-Al-Ti oxide system.

The compound of the monoclinic crystal structure represented by the general formula $Na_xAl_yTi^{3+}{}_{x-y}Ti^{4+}{}_{8-x}O_{16}$ which is the compound before the reduction of the electro-conductive material according to the first invention is prepared by heating a uniform mixture of $Al_2O_3$, $TiO_2$ and sodium salt in air at a temperature of about 1200° C. and it is present in the compositional range surrounded with data points 5, 7 and 9 of a phase diagram shown in FIG. 1. The phase-equilibrium diagram of Na-Al-Ti oxide system has been reported by Morgan, et al (P. E. D. Morgan, et al., J. Am. Ceram. Soc., 68(6)C-156-158 (1985)) but since it is considered somewhat insufficient, we made additional experiments and prepared the phase diagram shown in FIG. 1. Specifically, fine powders of $Al_2O_3$ and $TiO_2$ (average grain size of about 40 nm) prepared by a gas phase method and $Na_2CO_3$ were dispersed in water in such that the molar ratio (atomic ratio) of Na:Al:Ti constitutes the composition for the aimed compound, sufficiently mixed in a ball mill, dried and then further calcinated in air at 1200° C. for one hour. After cooling to the room temperature, the crystal phase was determined by X-ray diffractiometry to arrange the phase relation for the Na-Al-Ti oxide system, the result of which is shown in FIG. 1.

In FIG. 1, symbol "." represents each of data points. C represents the corundum phase, R represents the rutile phase, Y represents the Y phase as defined below and Z represents the phase of $NaTi_2Al_5O_{12}$ described in JCPDS File No. 21-1166. Although there is a possibility that the phase relation has not yet reached the equilibrium in a strict meaning, this represents substantially stable phases in view of practical use and it is considered substantially identical with the phase relation obtained in a case of preparing an actual sintered product by sintering at a temperature of about 1200° C.

Based on the result of the simultaneous measurement of thermogravimetric and differential thermoanalysis (TG-DTA), it has been known that $CO_2$ was released at a temperature from 400° to 600° C. upon decomposition of $Na_2CO_3$ when sintering the mixture of $Al_2O_3$, $TiO_2$, $Na_2O_3$ in air and, therefore, the specimen treated at 1200° C. is supposed to contain no carbon at all.

No phase other than a monoclinic crystal phase was detected at data points 5, 7 and 9. The monoclinic crystal phase in the region surrounded by the data points 5, 7 and 9 is referred as the Y phase. The data point 5 corresponds to a composition of Na:Al:Ti=2:2:6, which is represented as: $Na_2Al_2Ti^{4+}{}_6O_{16}$ (x=2 and y=2 in the above mentioned general formula). The data point 9 corresponds to a composition of Na:Al:Ti=1.5:1.5:6.5, which is represented as: $Na_{1.5}Al_{1.5}Ti^{4+}{}_{6.5}O_{16}$ (x=1.5 and y=1.5 in the above mentioned general formula). The data point 7 corresponds to a composition of Na:Al:Ti=2:1.5:6.5, which is represented as: $Na_2Al_{1.5}Ti^{3+}{}_{0.5}Ti^{4+}{}_6O_{16}$ (x=2 and y=1.5 in the above mentioned general formula). The compound represented by the data point 7 is not present on the plane of the three components: $Al_2O_3$—$TiO_2$—$Na_2O$, but on a line connecting $Na_2Al_2Ti^{4+}{}_6O_{16}$ (data point 5) and $Na_2Ti^{3+}{}_2Ti^{4+}{}_6O_{16}$. The compound: $Na_2Ti^{3+}{}_2Ti^{4+}{}_6O_{16}$ as described in JCPDS File No. 19-1249 is unstable when prepared by sintering in air and it is considered that those within a range prepared by substituting less than ¼ of Al in $Na_2Al_2Ti^{4+}{}_6O_{16}$ with $Ti^{3+}$ are stable. Two phases, the Y phase and the rutile phase $TiO_2$, were detected at the data point 6 and the data point 8, and $Na_2AlTi^{3+}Ti^{4+}{}_6O_{16}$ or $Na_2AlTi^{4+}{}_7O_{16}$ were not present stably in air.

The data points 1, 2, 3 and 4 were to investigate the change as $Na_2CO_3$ is added to a mixture of $Al_2O_3$ and $TiO_2$ at 47.3:52.7 by weight ratio, and the weight ratio of $Na_2O$, $Al_2O_3$ and $TiO_2$ in a product sintered in air at 1200° C. for one hour was calculated as 0:47.3:52.7, 2.04:46.33:51.63, 5.54:44.63:49.83 and 6.64:44.16:49.20 respectively at the data points 1, 2, 3 and 4. The crystal phases of these specimens determined by X-ray diffractiometry were two coexistent phases of the corundum phase and the rutile phase at the data point 1, three coexistent phases of the corundum phase, the rutile phase and the Y phase at the data points 2 and 3 and three coexistent phases of the corundum phase, the Y phase and the Z phase at the data point 4, which agreed with the anticipation from the phase diagram in FIG. 1.

Table 1 shows the lattice parameters for three kinds of Y phases at the data points 5, 7 and 9 where Y phase was the only phase present. The difference of lattice parameters between the data points was as small as contained in a range of allowable error.

In Table 1, numerical values added and subtracted as expressed by symbols ± are statistical errors represented as the standard deviation when the lattice parameter is calculated from the X-ray diffractiometry data by the method of least square.

From Table 1, the lattice parameters for the compound of the Y phase are determined as 1.209 nm ≤ $a_o$ ≤ 1.221 nm, 0.3754 nm ≤ $b_o$ ≤ 0.3773 nm, 0.643 nm ≤ $c_o$ ≤ 0.648 nm and 106.5° ≤ $\beta$ ≤ 108.2°.

TABLE 1

Results of the calculation for lattice parameters of Y phase

| Specimen No. | Atomic ratio Na:Al:Ti | Composition formula for compound | Lattice parameter | | | |
|---|---|---|---|---|---|---|
| | | | $a_o$ (nm) | $b_o$ (nm) | $c_o$ (nm) | $\beta(°)$ |
| 5 | 2:2:6 | $Na_2Al_2Ti^{4+}{}_6O_{16}$ | 1.214 ± 0.004 | 0.3763 ± 0.0004 | 0.646 ± 0.002 | 107.4 ± 0.7 |
| 7 | 2:1.5:6.5 | $Na_2Al_{1.5}Ti^{3+}{}_{0.5}Ti^{4+}{}_6O_{16}$ | 1.216 ± 0.005 | 0.3758 ± 0.0004 | 0.645 ± 0.002 | 107.3 ± 0.8 |
| 9 | 1.5:1.5:6.5 | $Na_{1.5}Al_{1.5}Ti^{4+}{}_{6.5}O_{16}$ | 1.213 ± 0.004 | 0.3765 ± 0.0008 | 0.645 ± 0.002 | 107.5 ± 0.7 |
| Reference: Morgan, et al. | | | | | | |
| | 2:2:6 | $Na_2Al_2Ti^{4+}{}_6O_{16}$ | 1.2122 | 0.3767 | 0.6428 | 107.49 |

When the mixture of the composition at the data point 5 was further treated at a high temperature of 1250° C., 1300° C. or 1350° C. for one hour, a similar Y phase crystal phase was formed by the treatment at 1250° C. or at 1300° C., whereas two phases, that is, Y phase and β-type aluminum titanate ($\beta$-$Al_2TiO_5$) were detected by the treatment at 1350° C. Accordingly, it is necessary to sinter at a temperature equal to or lower than 1300° C. for preparing the sintered product of Y phase. This is applicable to all of the Y phase compounds. In addition, at a temperature lower than 1200° C., the material diffusion was insufficient, and, therefore, no sufficient densification was achieved and porous sintered product was formed. Accordingly, it is necessary to apply sintering at a temperature equal to or higher than 1200° C. for the application uses requiring gas-impermeability. Furthermore, no Y phase was substantially formed at a temperature lower than 1000° C. and, accordingly, a temperature at least 1000° C. or higher is required in the case of preparing a porous sintered product or powdery material composed of Y phase.

Proton conductive material according to the first invention

The proton conductive material according to the first invention is prepared by reducing a compound of the Y phase, that is, a compound represented by the general formula: $Na_xAl_yTi^{3+}{}_{x-y}Ti^{4+}{}_{8-x}O_{16}$. Explanation is to be made referring to the reduction of the compound at the data point 5 as an example.

The powder specimen at the data point 5 was treated in a hydrogen atmosphere at a temperature from 600° C. to 1000° C. for one hour and the change of crystal structure was examined. The crystal form maintained its monoclinic structure under hydrogen atmosphere within the temperature range, but changes were observed within the lattice parameters. In Table 2, the data shows the change of the lattice parameters. Numerical values added or subtracted as expressed by symbols ± are statistical errors represented as the standard deviation when the lattice parameters are calculated from the X-ray diffractiometry data by the method of least squares.

From Table 2, the lattice parameters for the compound of the reduced Y phase are determined as 1.209 nm $\leq a_o \leq$ 1.221 nm, 0.3770 nm $\leq b_o \leq$ 0.3810 nm, 0.640 nm $\leq c_o \leq$ 0.645 nm and 106.6° $\leq \beta \leq$ 108.6°.

TABLE 2

Change of lattice parameters for $Na_2Al_2Ti^{4+}{}_6O_{16}$ by hydrogen reduction

| Reducing temperature | Lattice parameters | | | |
|---|---|---|---|---|
| | $a_o$ (nm) | $b_o$ (nm) | $c_o$ (nm) | $\beta$ (°) |
| Before reduction | 1.214 ± 0.004 | 0.3763 ± 0.0004 | 0.646 ± 0.002 | 107.7 ± 0.7 |
| 600° C. | 1.213 ± 0.004 | 0.3774 ± 0.0004 | 0.643 ± 0.002 | 107.7 ± 0.7 |
| 800° C. | 1.213 ± 0.004 | 0.3777 ± 0.0004 | 0.642 ± 0.002 | 107.6 ± 0.6 |
| 900° C. | 1.213 ± 0.004 | 0.3789 ± 0.0004 | 0.642 ± 0.002 | 107.6 ± 0.6 |
| 1000° C. | 1.215 ± 0.006 | 0.3804 ± 0.0006 | 0.643 ± 0.002 | 107.6 ± 1.0 |

At 1100° C., $Ti_3O_5$ or crystal phase having the same structure as that of $Ti_3O_5$ was formed, other than reduced Y phase.

Remarkable change was observed, particularly, in $b_o$ among the lattice parameters as compared before the reduction treatment.

The following three phenomena are considered to occur as the changes attributable to hydrogen reduction:

(1) tetravalent titanium is partially reduced into trivalent titanium.
(2) oxygen defects are formed,
(3) hydrogen is taken into the lattice.

Considering the charge balance in the crystals, it is supposed that the reduction proceeds by the combination of (1) and (2) or (1) and (3). It has not yet been clear as to which of (2) and (3) proceeds preferentially, but change of $Ti^{4+} \rightarrow Ti^{3+}$, that is, the change (1) proceeds in any of the cases.

It is considered that the lattice parameter $b_o$ is increased along with reduction, because the ionic radius is increased from 0.68 Å of $Ti^{4+}$ to 0.76 Å of $Ti^{3+}$, or because the crystal lattice is enlarged by the change in (3) above. Accordingly, the lattice parameter $b_o$ of the crystals and the degree of reduction can be correlated to each other. Considering the result of reduction at 1100° C. as footnoted below Table 2, reduction in a hydrogen atmosphere at a temperature higher than 1000° C. is not desirable since it causes decomposition of the Y phase to form a crystal phase showing almost the same X-ray diffraction profile as that of $Ti_3O_5$, which remarkably increases the electron conductivity. While on the other hand, by the treatment in a hydrogen atmosphere at a temperature lower than 600° C., no sufficient reduction is achieved and those materials showing preferable proton conductivity can not be obtained.

It has been confirmed by the X-ray diffractiometry that both of the compounds expressed by the general formula: $Na_xAl_yTi^{3+}{}_{x-y}Ti^{4+}{}_{8-x}O_{16}$ in which $1.5 \leq x \leq 2$, $1.5 \leq y \leq 2$, $x \geq y$ and the proton conductive material obtained by reducing the above-mentioned compound at a temperature between 600° C. and 1000° C. in the hydrogen atmosphere have monoclinic crystal structure. As has been described above, it has been found that the change of the lattice parameters of crystals determined by the X-ray diffractiometry reflects the difference in the crystal structure before and after the reduction. Although there are little changes for the lattice parameters $a_o$, $c_o$ and $\beta$ before and after the reduction. That is, the value for $b_o$ at the data point 5 before reduction was 0.3763±0.0004 nm, whereas the value for $b_o$ was increased to 0.3774±0.0004 nm by the reduction in hydrogen at 600° C. and, accordingly, $b_o$ was changed by about 0.001 nm. On the other hand, the value $b_o$ changed to 0.3804±0.0006 nm by the reduction in hydrogen at 1000° C. and, as compared with the value before reduction, the maximum difference including the error was about 0.005 nm.

It has been found that the material obtained shows unprecedentedly excellent proton conductivity with little electron conductivity when the lattice parameter $b_o$ is increased by the reduction while maintaining the basic structure of Y phase.

It has also been found that when the Y phase powder reduced in hydrogen was oxidized again by heat treatment in air at a temperature between 1200° C. and 1300° C., the lattice parameters resumed the values before reduction. Accordingly, the material is oxidized and reduced reversibly and the extent of the change of $b_o$ due to reduction can be examined by the heat treatment in air.

The proton conductive material according to the first invention is a compound having a monoclinic crystal structure of a composition represented as $x \geq y$, $1.5 \leq x \leq 2$, $1.5 \leq y \leq 2$, $z = 8 - y$, assuming the atomic ratio of Na, Al, Ti (total of $Ti^{3+} + Ti^{4+}$) as x:y:z with the lattice parameter $b_o$ shifted by reduction. After properly reduced, $b_o$ takes the numerical value as described above but, if the value is different from the above, it means that a great amount of impurities is contained or the reduction condition is not adequate.

As has been described above, the proton conductive material according to the first invention is a compound having monoclinic crystal structure which is reduced reversibly from the compound having the monoclinic crystal structure expressed by the general formula: $Na_xAl_yTi^{3+}{}_{x-y}Ti^{4+}{}_{8-x}O_{16}$.

As the form of the proton conductive material according to the first invention, there may be considered a granular, porous or single crystal form, and the most appropriate form as the solid electrolyte for a fuel cell or for the production of hydrogen, which is the most promising application use, is a polycrystalline form prepared by molding the starting powder material into a desired shape followed by sintering. Further, those having porosity of less than 5%, particularly, having no substantial open pores are desired, because the porosity may cause some movement of carriers other than protons.

On the other hand, in the case of using the compound as the sensors, for example, for combustible gases, there is no requirement for densification but those having greater porosity are rather desirable.

Method of producing proton conductive material

As has been described above, since the proton conductive material according to the first invention is obtained by reducing a compound of the monoclinic crystal structure expressed by the general formula: $Na_x Al_y Ti^{3+}_{x-y} Ti^{4+}_{8-x} O_{16}$, it is necessary that Na, Al, Ti are uniformly mixed and starting materials of satisfactory sinterability are used in order to obtain those having satisfactory properties. However, in the case of using the material for sensor such as for combustible gases, etc., those having high porosity are desired as described above and there is no requirement for the densification. For that purpose, it is only necessary to use such starting material in which Na, Al, Ti are uniformly mixed so that the reaction for forming the compound is completed during sintering with no residual unreacted products, and there is no particular requirement for good sinterability.

The method of preparing the starting material usually considered is to mix the starting aluminum material ($Al_2O_3$) and the starting titania material ($TiO_2$) mechanically, to which sodium salt is added. If $Al_2O_3$ powder and $TiO_2$ powder of sufficiently small particle size are used and mixed well, there is no substantial problems in view of the compositional homogenity, but there is still present a problem with the sinterability. In the case of using the material according to the present invention for the application such as fuel cells or hydrogen production, it is necessary that the material has no gas permeability and it is thus necessary that the material is sintered to a sufficient density. Since no sufficient densification is achieved by pressureless sintering at a desirable temperature by adopting the method of mixing the starting alumina material and the starting titania material mechanically and adding sodium salt thereto, it is necessary to sinter them by means of hot pressing or the like, which is, however, not economical. Particularly, presence of $Al_2O_3$ brings about a severe problem. Particles composed solely of $Al_2O_3$ impair the sinterability.

On the other hand, satisfactory sinterability can be achieved in the case of using particles containing two components, $Al_2O_3$ and $TiO_2$, in each of the particles.

Since the sinterability of $TiO_2$ is also satisfactory, if a mixture of particles containing the two components ($Al_2O_3$ and $TiO_2$) and a relatively small amount of $TiO_2$ particles is used as the starting material, the sinterability is also satisfactory. Particularly, if a strict control of composition is difficult for the particles containing both $Al_2O_3$ and $TiO_2$, it is desirable to make the $Al_2O_3$ content somewhat excessive in the composition of the particles containing two components and to mix $TiO_2$ for controlling the overall composition.

The crystal phase of $Al_2O_3$ in the starting material, is desirably of $\gamma$ or $\delta$ form in view of reactivity and siterability. Since $\gamma$ or $\delta$-phase $Al_2O_3$ is metastable and therefore highly reactive, the reaction of forming $Na_x Al_y Ti^{3+}_{x-y} Ti^{4+}_{8-x} O_{16}$ readily proceeds. The sinterability is satisfactory in the case $Al_2O_3$ is homogeneously mixed with $TiO_2$ as composite particles.

It is desired that $TiO_2$ in the starting material is mainly of the rutile form, because $TiO_2$ takes a rutile crystal form when $Al_2O_3$ and $TiO_2$ are homogeneously mixed and $TiO_2$ contains solid solution of $Al_2O_3$.

Referring to the size of particles containing both $Al_2O_3$ and $TiO_2$, an average size from 25 to 100 nm is desirable in view of reactivity and sinterability. As the particle size is smaller, the forming reaction proceeds more readily and the sinterability is also better.

Composite alumina-titania powder obtained by the gas phase method as described in Japanese Patent Laid-Open No. Sho 62-72522 (U.S. Pat. No. 4,746,638 and West German Patent Laid-Open DE 3633030A1) is a powder of satisfactory sinterability, in which the average particle size is from 25 to 100 nm, $Al_2O_3$ is $\gamma$ or $\delta$ phase, $TiO_2$ is mainly of rutile phase. And powder contains neither the compound phase such as $\beta$-$Al_2TiO_5$ nor $\alpha$ crystal form of $Al_2O_3$. Satisfactory sinterability is also obtained in a case of adding the sodium salt to the composite $Al_2O_3$-$TiO_2$ powder described above, and the powder compact can be sintered to a product composed solely of the Y phase having a relative density of greater than 95% at a temperature which is not higher than 1300° C. for avoiding formation of aluminum titanate and not lower than 1200° C. for achieving sufficient density.

At a temperature lower than 1200° C., no sufficient densification can be achieved and relative density of higher than 95% can not be obtained by pressureless sintering.

Proton conductive material can be obtained by reducing, with hydrogen, sintered product composed solely of Y phase which is prepared beforehand in air. Direct sintering of the powder in a hydrogen atmosphere without precedent sintering in air requires a high temperature between 1200° and 1300° C. In addition, Y phase can not be obtained and the mechanical strength is poor. Accordingly, it is necessary to adopt a method of reducing Y phase in a hydrogen atmosphere after sintering in air. Sintered products having satisfactory proton conductivity and low electron conductivity can be obtained by the treatment in hydrogen under the pressure of 1 atm (ab) at a reducing temperature between 600° and 1000° C. for one hour. The lattice parameter $b_o$ obtained in this case is larger by about 0.001 to 0.005 nm than that of products sintered in air. The reducing treatment may be conducted in hydrogen under an elevated pressure. In this case, the reduction may possibly proceed further and the parameter $b_o$ may become greater.

Measurement for the electrical conductivity

Figure 2:
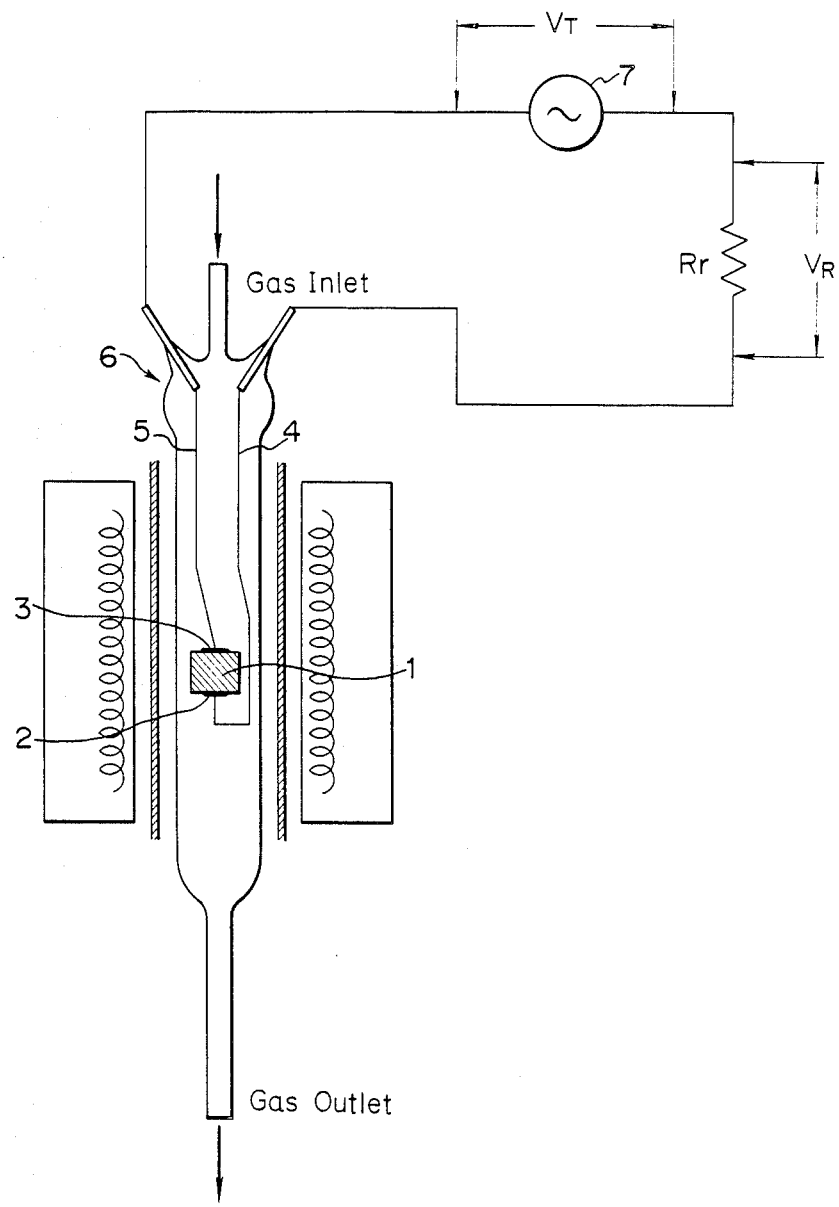
FIG. 2 is a schematic view illustrating the method of measuring the electrical conductivity.

The electrical conductivity characterizing the material (properties) was measured by the method described below using the scheme as shown in FIG. 2.

A specimen 1 was prepared by using a pellet of about 10 mm$\phi$ diameter and 1-1.5 mm thickness, coating silver pastes 2, 3 to the center on both sides thereof to a size of about 5 mm$\phi$, bonding silver wires 4 and 5 thereto and baking them in hydrogen at 500° C.

An apparatus 6 is adapted so as to change the temperature and atmosphere gas. After the temperature was adjusted to a predetermined value, an alternating current having a voltage $V_T$ (80 mV was used in this experiment) and a frequency f (10 Hz–100 kHz was used in this experiment) was generated by a function generator 7 and the resistance Rs ($\Omega$) of the specimen was determined by measuring the voltage drop $V_R$ across the known resistance $R_R$ ($\Omega$) as:

$$Rs = \frac{V_T - V_R}{V_R} \cdot Rr$$

Assuming the area of the baked silver paste portion, that is, the electrode portion as A (cm$^2$) and the thickness of the specimen as l cm, the electrical conductivity of the specimen ($\Omega^{-1}$ cm$^{-1}$) is represented as:

$$\sigma = (\gamma/A) \cdot (1/Rs)$$

The proton conductive material according to the first invention is in a reduced state from the compound of the monoclinic crystal structure expressed by the general formula: $Na_xAl_yTi^{3+}_{x-y}Ti^{4+}_{8-x}O_{16}$. When the lattice parameter $b_o$ is increased which is at least partly attributable to change of $Ti^{4+} \rightarrow Ti^{3+}$, the material exhibits proton conductivity with little electron conductivity.

According to the second invention, the proton conductive material according to the first invention can be produced by preparing a compound of a monoclinic crystal structure expressed by the general formula: $Na_xAl_yTi^{3+}_{x-y}Ti^{4+}_{8-x}O_{16}$ by using the specific starting material and the sintering method and then properly reducing the compound.

Example 1

As the starting powder material, 50 g of composite $Al_2O_3$—$TiO_2$ powder with 22.8% by weight of $Al_2O_3$ content produced by the gas phase process as described in Japanese Patent Laid-Open No. Sho 62-72522 and 15.0 g of $TiO_2$ powder prepared by the gas phase process were used. The gas phase process means such a method of evaporizing (or sublimating) a highly volatile precursor and reacting the same in a gas phase to obtain a product. In the gas phase process for producing composite $Al_2O_3$—$TiO_2$ powder as described in Japanese Patent Laid-Open No. Sho 62-72522 U.S. Pat. No. 4,746,638, a method of blowing a vapor mixture of $AlCl_3$ and $TiCl_4$ into oxygen-excessive combustion flames is used.

After dispersing the starting powder material described above into about 200 ml of water in which 11.9 g of anhydrous sodium carbonate had previously been dissolved, organic additives were added and mixed for 24 hours. The atomic ratio of Na:Al:Ti was adjusted to 2:2:6. After drying and pulverizing the mixture, it was molded into pellets by an isostatic press method and then sintered in an air atmosphere under the condition of the highest temperature at 1250° C. for 3 hours. When the polished surface of the pellet was examined by X-ray diffractiometry, the Y phase was the only phase detected. From the lattice parameters of the Y phase (Table 1), the theoretical density of the Y phase expressed as $Na_2Al_2Ti^{4+}_6O_{16}$ was calculated as 3.796 g/cm$^3$.

The density of the pellets sintered at 1250° C. for 3 hours was 3.703 g/cm$^3$, which corresponds to 97.6% relative to the theoretical density. The pellets sintered in air was treated in a steam stream at the highest temperature of 800° C. for one hour.

It is considered that $Ti^{4+}$ was reduced to $Ti^{3+}$, oxygen defects were formed and $H^+$ was introduced into the crystal lattice by the treatment as has been described above. Actually, the lattice parameter $b_o$ of the crystals was increased by about 0.0014 nm during the treatment.

The electrical conductivity of the sintering product was measured while varying the atmosphere, temperature and AC frequency. The results are shown in FIG. 3.

In the hydrogen ($H_2$) atmosphere, the electrical conductivity showed a thermo-activating type temperature dependency and did not show frequency dependency within the temperature range for the measurement. Such dependencies appear as features when sufficient amount of species of ionic conduction are present.

On the other hand, in helium (He) or air atmosphere, the electrical conductivity was much lower than that in hydrogen atmosphere. Furthermore, a frequency dependency in helium was confirmed, and the electrical conductivity was particularly low at low frequencies which is the feature when no charge carriers are supplied from the outside and polarization is caused, although it is ion conductive.

Figure 3:
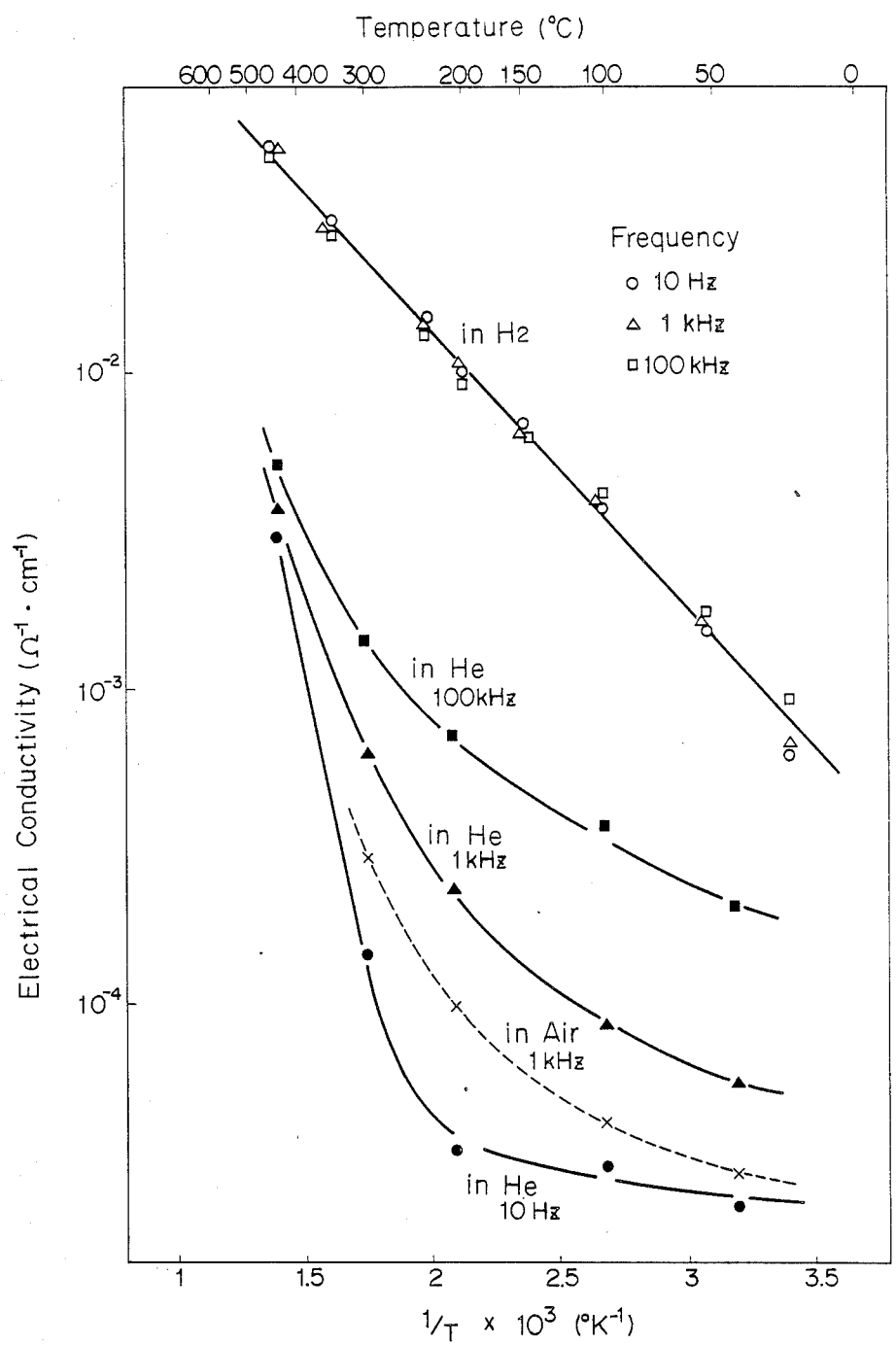
FIG. 3 is a graph illustrating the electrical conductivity of the sintered product of Example 1 in hydrogen, helium and air.

From the data shown in FIG. 3, it can be concluded that charge carriers in this sintered product are mainly protons ($H^+$).

The $BaCeO_3$ derived material in which 10% of Ce was substituted with Nd ($BaCe_{0.9}Nd_{0.1}O_{3-a}$) showed highest proton conductivity (not including hydration protons) among the previously reported materials. The electrical conductivity of $BaCe_{0.9}Nd_{0.1}O_{3-a}$ was, for example, $7 \times 10^{-3} \Omega^{-1}$ cm$^{-1}$ at 600° C. in hydrogen atmosphere, whereas the proton conductivity of this sample was, for example, $5 \times 10^{-2} \Omega^{-1}$ cm$^{-1}$ at 450° C. This sample showed much higher electrical conductivity at lower temperatures.

Figure 4:
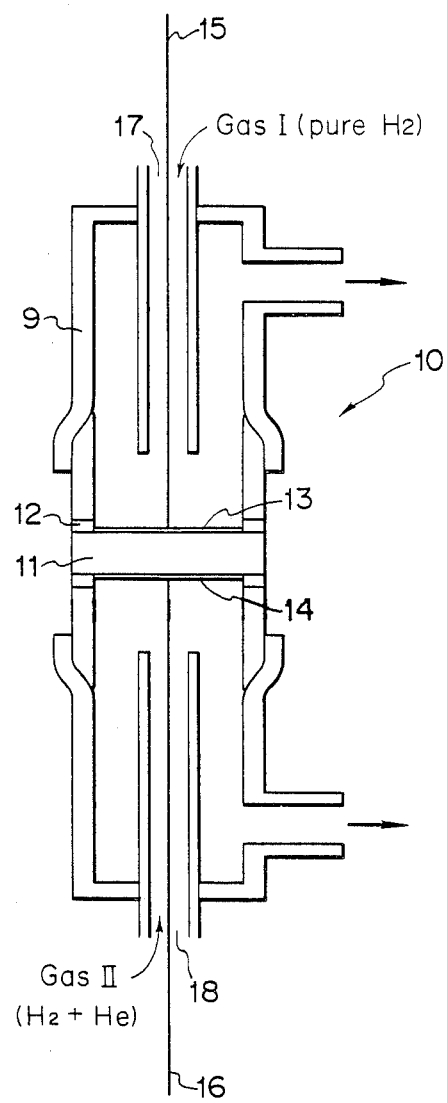
FIG. 4 is a schematic view illustrating the constitution of a hydrogen concentration cell using the sintered product of Example 1 as the solid electrolyte.

For confirming that the electrical conductivity in hydrogen atmosphere is derived from protons, not from electrons, a hydrogen concentration cell (gas cell) as shown in FIG. 4 was manufactured.

In FIG. 4, the above-mentioned sintered product was used as a solid electrolyte 11 at the center of a cell main body 10 made of a glass tube (trade name Pyrex) and the gap between the solid electrolyte 11 and the glass tube 9 was tightly closed with seal 12 made of asbestos tape and water glass, and silver wires 15 and 16 were connected by silver paste 13 and 14 to both sides of the solid electrolyte 11. The silver wires 15 and 16 were led out respectively from gas inlets 17 and 18 to constitute electrodes. Pure hydrogen was supplied as gas I from the gas inlet 17, while a gas comprising hydrogen diluted with helium was used as gas II from the gas inlet 18, and the generated electromotive force was measured while controlling both of the gases I and II above to the atmospheric pressure.

Figure 5:
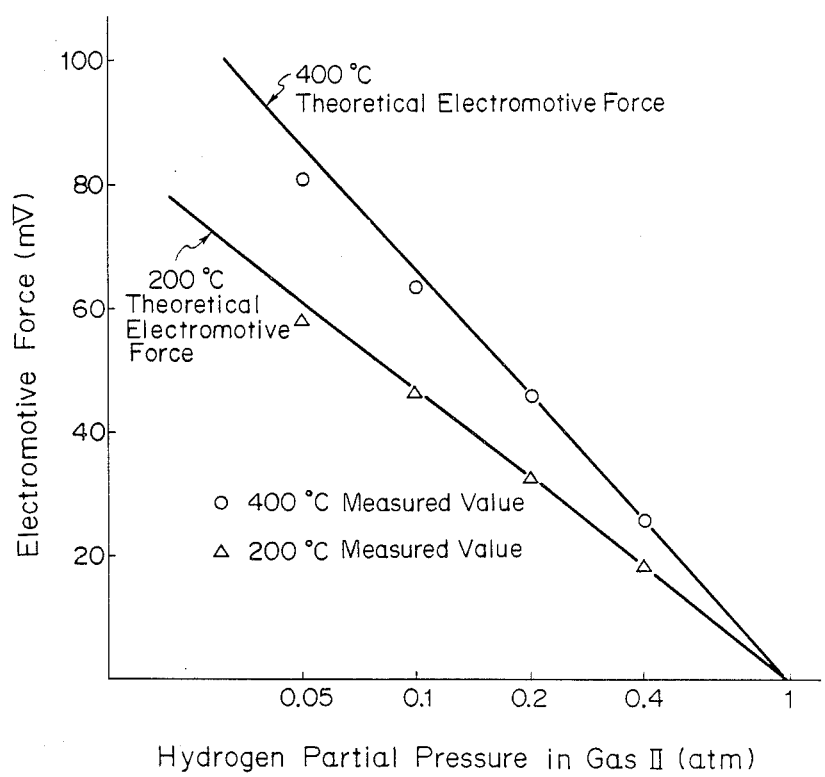
FIG. 5 is a graph showing the result of measuring the electromotive force of the hydrogen concentration cell of FIG. 4.

The result of the measurement is shown in FIG. 5.

The electromotive force was substantially the same as the theoretical value both at 200° C. and 400° C., by which the proton conductivity was demonstrated.

Example 2

Figure 6:
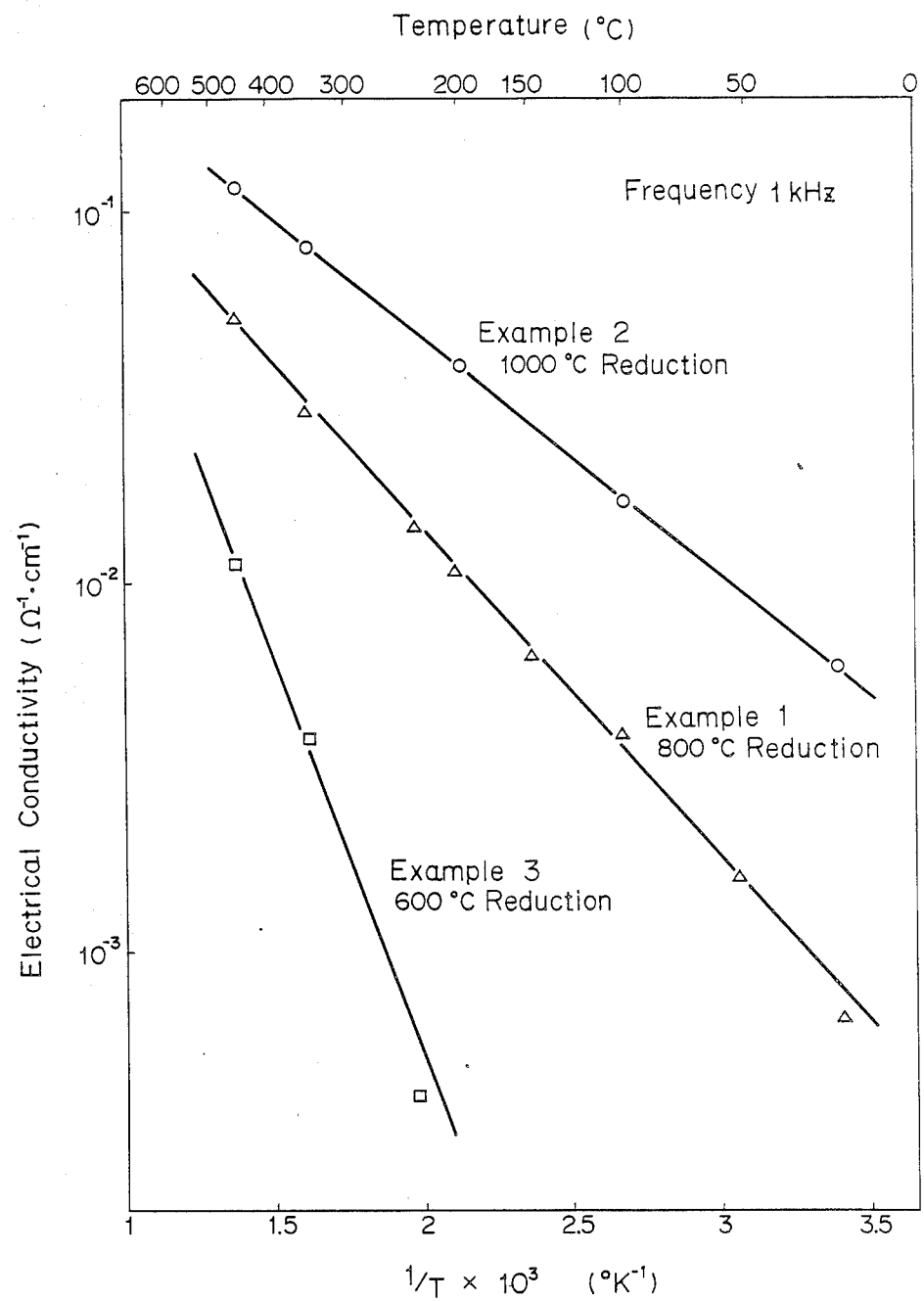
FIG. 6 is a graph for comparing the electrical conductivity of the sintered products of Examples 1, 2 and 3 in hydrogen.

A pellet-shaped specimen was prepared in the same manners as in the preparation method of Example 1 except for changing the temperature for the hydrogen reduction to 1000° C. The electrical conductivity of the specimen in the hydrogen atmosphere is shown in FIG. 6, together with the data of Example 1. It was higher as compared with that of Example 1. Furthermore, the hydrogen concentration cell using the specimen as the solid electrolyte, generated the electromotive force of theoretical value.

Example 3

A pellet-shaped specimen was manufactured in the same manners as in the preparation process of Example 1 except for changing the temperature for the hydrogen reduction to 600° C. The electrical conductivity of the specimen in the hydrogen atmosphere is also shown in FIG. 6. It shows a sufficiently higher value as compared with that of the proton conductor reported so far, although it was lower as compared with those of Examples 1 or 2.

11

Example 4

50 g of composite $Al_2O_3$—$TiO_2$ powder containing 16.2% by weight of $Al_2O_3$ content prepared by a gas phase process, 13.1 g of $TiO_2$ powder prepared by a gas phase process and 8.42 g of anhydrous sodium carbonate were mixed in the same manner as in Example 1. The atomic ratio of Na:Al:Ti was adjusted to 1.5:1.5:6.5. The mixture was molded and sintered under the same conditions as those in Example 1. When the polished surface of the pellet was examined by X-ray diffractiometry, a Y phase was the only phase detected. The theoretical density of the Y phase expressed by $Na_{1.5}Al_{1.5}Ti_{6.5}O_{16}$ was calculated as 3.796 g/cm$^3$ by using the data for the lattice parameters in Table 1.

The apparent density of the pellet sintered at 1250° C. for 3 hours was 3.625 g/cm$^3$ and it reached 95.5% of the theoretical density. The pellet sintered in air was treated in a hydrogen gas stream at the highest temperature of 700° C. for one hour.

Figure 7:
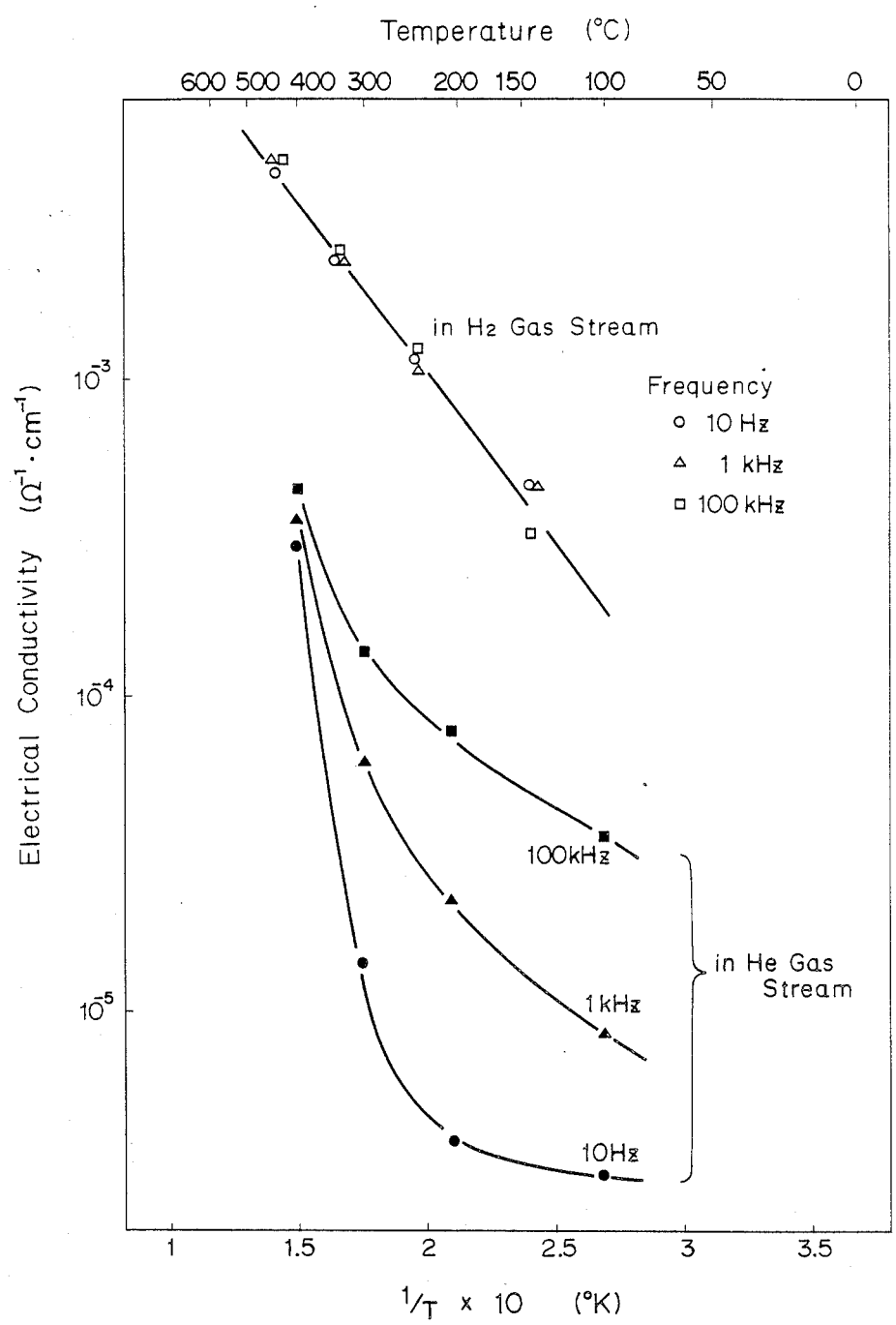
FIG. 7 is a graph illustrating the electrical conductivity of the sintered product of Example 4 in hydrogen and helium.

When the electrical conductivity of the sintered product after the hydrogen treatment was measured in hydrogen or in helium while varying the temperature and the frequency, data as shown in FIG. 7 were obtained. The electrical conductivity is higher in hydrogen than in helium, and had no frequency dependency in hydrogen. These results are the features when the charge carriers are protons. In this example, the electrical conductivity was lower as compared with that in Example 1, but it was satisfactory as compared with the electroconductivity of proton conductive ceramics reported so far.

Example 5

50 g of composite $Al_2O_3$—$TiO_2$ powder with 16.2 wt % of $Al_2O_3$ content, 13.1 g of $TiO_2$ powder prepared by a gas phase process and 11.2 g of anhydrous sodium carbonate used in Example 4 were mixed in the same manner as in Example 1. The atomic ratio of Na:Al:Ti was adjusted to 2:1.5:6.5. After molding the mixture into a pellet, it was sintered in an air atmosphere under the condition of the highest temperature at 1300° C. for one hour.

When the polished surface of the pellet was examined by X-ray diffractiometry, a Y phase was the only phase detected. The theoretical density of the Y phase represented as $Na_2Al_{1.5}Ti^{3+}_{0.5}Ti^{4+}_6O_{16}$ was calculated as 3.857 g/cm$^3$ by using the data of the lattice parameters in Table 1. The apparent density of the sintered pellet was 3.702 g/cm$^3$, which was 96.0% of the theoretical density.

The pellet thus sintered in air was treated in hydrogen gas stream at the highest temperature of 700° C. for one hour. The electrical conductivity in hydrogen and in helium at 300° C. was measured, and values shown in Table 3 were obtained. Similarly as in Examples 1 and 4, the electrical conductivity was relatively high in hydrogen and no frequency dependency was observed, whereas the electrical conductivity was lower. Again these tendencies are the features when the charge carriers are mainly composed of protons.

Example 6

5 g was taken from each powder prepared in Examples 1, 4 and 5, sufficiently mixed in a mortar and then molded and sintered under the same conditions as those in Example 1. It was confirmed based on X-ray diffractiometry that the sintered product consisted solely of a Y phase. The atomic ratio of Na:Al:Ti was calculated as 1.83:1.67:6.33 and it was estimated that the Y phase represented as $Na_{1.83}Al_{1.67}Ti^{3+}_{0.16}Ti^{4+}_{6.17}O_{16}$ was formed. The apparent density of the sintered pellet was 3.698 g/cm$^3$. When the theoretical density was calculated on the assumption that the lattice parameters had the mean values of the three types of Y phases in Table 1, it was 3.181 g/cm$^3$ and the relative density of the sintering product was calculated to be 96.9%.

The pellet thus sintered in air was treated in hydrogen gas stream at the highest temperature of 700° C. for one hour. The electrical conductivity of the pellet was measured in hydrogen and in helium at 300° C., and the values shown in Table 3 were obtained. The features of proton conductivity are confirmed also in this case as in Example 5.

TABLE 3

| | Electroconductivity data at 300° C. of proton conductive materials in Examples 5, 6 (unit : $\Omega^{-1}cm^{-1}$) | | | | | |
|---|---|---|---|---|---|---|
| | in hydrogen | | | in helium | | |
| Specimen | 10 Hz | 1 kHz | 100 kHz | 10 Hz | 1 kHz | 100 kHz |
| Example 5 | $8.6 \times 10^{-3}$ | $8.8 \times 10^{-3}$ | $8.8 \times 10^{-3}$ | $1.4 \times 10^{-4}$ | $3.5 \times 10^{-4}$ | $9.0 \times 10^{-4}$ |
| Example 6 | $6.0 \times 10^{-3}$ | $6.2 \times 10^{-3}$ | $6.0 \times 10^{-3}$ | $0.4 \times 10^{-4}$ | $1.5 \times 10^{-4}$ | $3.9 \times 10^{-4}$ |

Since the proton conductive material according to the present invention shows stable operation and high electrical conductivity even at low temperatures as compared with the previously reported materials and, since inexpensive components are used therefor, it is useful as the solid electrolyte of fuel cells. Furthermore, it can also be used as the sensor material for combustible gases such as hydrogen.

What is claimed is:

1. Proton conductive material comprising a compound of a monoclinic crystal structure which is in a reversibly reduced state from a compound of a similar monoclinic crystal structure represented by the general formula:

$$Na_xAl_yTi^{3+}_{x-y}Ti^{4+}_{8-x}O_{16},$$

in which $1.5 \leq x \leq 2$, $1.5 \leq y \leq 2$, $x \geq y$, the lattice parameter $b_o$ of the compound of a monoclinic crystal structure in a reduced state being greater by more than 0.001 nm than the lattice parameter $b_o$ of the compound of a similar monoclinic crystal structure represented by the general formula:

$$Na_xAl_yTi^{3+}_{x-y}Ti^{4+}_{8-x}O_{16}.$$

wherein the compound of a monoclinic crystal structure in a reduced state is formed by applying a reducing treatment to the compound of a similar monoclinic crystal structure represented by the general formula: $Na_xAl_yTi^{3+}_{x-y}Ti^{4+}_{8-x}O_{16}$ in a hydrogen atmosphere and at a temperature of from 600° C. to 1000° C.

2. Proton conductive material as defined in claim 1, wherein the lattice parameter $b_o$ of the compound of a monoclinic crystal structure in a reduced state is greater by a range of from 0.001 nm to 0.005 nm than the lattice parameter $b_o$ of the compound of a similar monoclinic crystal structure represented by the general formula:

$Na_xAl_yTi^{3+}{}_{x-y}Ti^{4+}{}_{8-x}O_{16}$.

3. Proton conductive material as defined in claim 1, wherein the compound of a monoclinic crystal structure in a reduced state is a compound having lattice parameters at room temperature of:

$a_o = 1.209-1.221$ nm, $b_o = 0.377-0.381$ nm, $c_o = 0.640-0.645$ nm and $\beta = 106.6°-108.6°$.

4. Proton conductive material as defined in claim 1, wherein the compound of a monoclinic crystal structure in a reduced state is a compound which can be changed reversibly back to the compound of a similar monoclinic crystal structure represented by the general formula: $Na_xAl_yTi^{3+}{}_{x-y}Ti^{4+}{}_{8-x}O_{16}$ by applying heat treatment in air at a temperature within a range of from 1200° C. to 1300° C.

5. Proton conductive material as defined in claim 1, wherein the material has a polycrystalline sintered structure.

6. Proton conductive material as defined in claim 1, wherein the material has a porosity of less than 5%.

* * * * *